US009366267B2

(12) United States Patent
Nakata

(10) Patent No.: US 9,366,267 B2
(45) Date of Patent: Jun. 14, 2016

(54) HYDRAULIC UNIT

(71) Applicant: DAIKIN INDUSTRIES, LTD., Osaka-shi, Osaka (JP)

(72) Inventor: Tetsuo Nakata, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 320 days.

(21) Appl. No.: 14/345,109

(22) PCT Filed: Sep. 24, 2012

(86) PCT No.: PCT/JP2012/006062
§ 371 (c)(1),
(2) Date: Mar. 14, 2014

(87) PCT Pub. No.: WO2013/046630
PCT Pub. Date: Apr. 4, 2013

(65) Prior Publication Data
US 2014/0260234 A1 Sep. 18, 2014

(30) Foreign Application Priority Data
Sep. 27, 2011 (JP) ................................ 2011-210384

(51) Int. Cl.
*F16D 31/02* (2006.01)
*F04D 29/58* (2006.01)
*F04B 49/06* (2006.01)
*F15B 1/26* (2006.01)
*F15B 19/00* (2006.01)

(52) U.S. Cl.
CPC .......... *F04D 29/5806* (2013.01); *F04B 49/065* (2013.01); *F15B 1/26* (2013.01); *F15B 19/005* (2013.01)

(58) Field of Classification Search
CPC ......... F15B 1/26; F15B 19/005; F04B 49/065
USPC ........................................................... 60/456
See application file for complete search history.

(56) References Cited

U.S. PATENT DOCUMENTS 8,696,331 B2 * 4/2014 Cunningham .......... F04D 13/10 417/423.11
2010/0154398 A1 6/2010 Ochi

FOREIGN PATENT DOCUMENTS

| | | | |
|---|---|---|---|
| JP | 63-282063 | A | 11/1988 |
| JP | 4-57685 | U | 5/1992 |
| JP | 8-109872 | A | 4/1996 |
| JP | 11-313466 | A | 11/1999 |
| JP | 2005-16596 | A | 1/2005 |
| JP | 2006-258271 | A | 9/2006 |
| JP | 4245065 | B2 | 3/2009 |

OTHER PUBLICATIONS

International Search Report issued in PCT/JP2012/006062 mailed Oct. 23, 2012.

* cited by examiner

*Primary Examiner* — Michael Leslie
(74) *Attorney, Agent, or Firm* — Birch, Stewart, Kolasch & Birch, LLP

(57) ABSTRACT

An oil-hydraulic unit includes a power module generating heat when energized. The power module is provided on the bottom surface of a recess facing hydraulic oil in a tank. Thus, the power module is cooled by the hydraulic oil in the tank. This reduces the difference in temperature between the power module and the hydraulic oil in the tank. In the oil-hydraulic unit, the temperature sensor detects the temperature of the power module. The oil temperature in the tank is estimated based on the temperature detected by the temperature sensor.

6 Claims, 9 Drawing Sheets

HYDRAULIC UNIT

TECHNICAL FIELD

The present invention relates to hydraulic units each configured to feed hydraulic fluid in a tank to a hydraulic actuator, and more particularly to cost reduction.

BACKGROUND ART

Hydraulic units each configured to feed hydraulic fluid in a tank to a hydraulic actuator have been conventionally known. For example, PATENT DOCUMENT 1 describes a hydraulic unit of this type. The hydraulic unit is an oil-hydraulic unit configured to feed hydraulic oil to an oil-hydraulic actuator, and includes a tank, a pump, a motor, and a power conversion device. In the oil-hydraulic unit, the power conversion device converts electric power into a predetermined power, and feeds the power to the motor to rotate the pump connected to the motor. The pump sucks hydraulic oil in the tank, and discharges the hydraulic oil to feed the hydraulic oil to the oil-hydraulic actuator.

CITATION LIST

Patent Document

Patent Document 1: Japanese Patent No. 4245065

SUMMARY OF THE INVENTION

Technical Problem

Incidentally, in order to prevent piping components, such as a gasket, from being deteriorated due to overheating of hydraulic fluid, conventional hydraulic units including the oil-hydraulic unit of PATENT DOCUMENT 1 have each included a fluid temperature sensor for a tank to manage the fluid temperature in the tank. Furthermore, in order to prevent a power module of a power conversion device from being broken due to overheating of the power module, a special temperature sensor has been provided in the vicinity of or inside the power module to protect the power module from overheating. For this reason, it has been conventionally expensive to install such two temperature sensors, and it has been difficult to reduce the cost of hydraulic units.

It is therefore an object of the present invention to eliminate fluid temperature sensors to reduce the cost of a hydraulic unit.

Solution to the Problem

A first aspect of the invention is directed to a hydraulic unit including: a tank (30) configured to store hydraulic fluid; a pump (23) configured to suck the hydraulic fluid through an outlet (34) of the tank (30); a feed passage (21) through which the hydraulic fluid sucked by the pump (23) is fed to a hydraulic actuator; a return passage (22) through which the hydraulic fluid is returned from the hydraulic actuator to a return port (33) of the tank (30); an electric motor (24) configured to rotate the pump (23); and a power conversion device (50) configured to convert electric power into a predetermined power and feed the converted power to the electric motor (24). In the hydraulic unit, the power conversion device (50) includes a power module (53) including a heat dissipating section (35*a*, 38*a*) facing the hydraulic fluid in the tank (30), and a temperature sensor (59) configured to detect a temperature of the power module (53), and the hydraulic unit further includes a fluid temperature estimator (76) configured to estimate a temperature of the hydraulic fluid in the tank (30) based on the temperature detected by the temperature sensor (59).

In the first aspect of the invention, the heat dissipating section (35*a*, 38*a*) of the power module (53) faces the hydraulic fluid in the tank (30). Thus, the power module (53) is cooled by the hydraulic fluid. This allows the power module (53) to have substantially the same temperature as the hydraulic fluid in the tank (30).

In the first aspect of the invention, the fluid temperature in the tank (30) is estimated based on the temperature detected by the power module (53). In a situation where the temperature of the power module (53) and the fluid temperature in the tank (30) are substantially equal to each other as described above, when the fluid temperature in the tank (30) is estimated based on the temperature detected by the power module (53), a small error is merely observed, and the fluid temperature in the tank (30) can be obtained as an estimate value. This eliminates the need for measuring the fluid temperature in the tank (30) with a special fluid temperature sensor unlike the conventional art.

According to a second aspect of the invention, in the first aspect of the invention, the temperature sensor (59) may be provided on the heat dissipating section (35*a*, 38*a*) of the power module (53).

In the second aspect of the invention, the temperature sensor (59) is provided on the heat dissipating section (35*a*, 38*a*) facing the hydraulic fluid in the tank (30). This facilitates allowing the temperature sensor (59) to accurately detect the fluid temperature in the tank (30), and allows the temperature detected by the temperature sensor (59) to be closer to the fluid temperature in the tank (30).

According to a third aspect of the invention, in the first or second aspect of the invention, the heat dissipating section (35*a*, 38*a*) of the power module (53) may be closer to the outlet (34) of the tank (30) than to the return port (33) thereof.

In the third aspect of the invention, the heat dissipating section (35*a*, 38*a*) is away from the return port (33). This reduces contact between hydraulic fluid that has just passed through the return port (33) and returned into the tank (30) and the heat dissipating section (35*a*, 38*a*), and facilitates bringing hydraulic fluid that has been returned into the tank (30) and has been diffused therein into contact with the heat dissipating section (35*a*, 38*a*). Thus, the temperature sensor (59) detects the temperature of the power module (53) cooled by the diffused hydraulic fluid, and the fluid temperature estimator (76) derives the temperature of the diffused hydraulic fluid.

According to a fourth aspect of the invention, in any one of the first through third aspects of the invention, a baffle (39) may be provided in the tank (30) to regulate a flow of hydraulic fluid from the return port (33) to the outlet (34).

In the fourth aspect of the invention, the baffle (39) is provided. This increases the period of time after hydraulic fluid is returned into the tank (30) and until the hydraulic fluid reaches the heat dissipating section (35*a*, 38*a*), and during the period of time, the hydraulic fluid is adequately diffused. Thus, the fluid temperature estimator (76) derives the temperature of the adequately diffused hydraulic fluid.

Advantages of the Invention

According to the present invention, the power module (53) is provided on the heat dissipating section (35*a*, 38*a*) facing hydraulic fluid in the tank (30). The temperature of the power module (53) is detected, and the fluid temperature in the tank (30) is estimated based on the detected temperature. Thus, the power module (53) is cooled by the hydraulic fluid, and the power module (53) has substantially the same temperature as the hydraulic fluid in the tank (30). Under such conditions, the fluid temperature in the tank (30) is estimated based on the detected temperature of the power module (53), and the fluid temperature in the tank (30) can be thus obtained as an estimate value with a small error. This eliminates the need for measuring the fluid temperature in the tank (30) with a special fluid temperature sensor unlike the conventional art, and can reduce the cost of the hydraulic unit (10).

According to the second aspect of the invention, the temperature sensor (59) configured to detect the temperature of the power module (53) is provided on the heat dissipating section (35*a*, 38*a*) of the power module (53). This allows the temperature detected by the temperature sensor (59) to be closer to the fluid temperature in the tank (30), thereby enabling a more accurate estimation of the fluid temperature based on the temperature detected by the temperature sensor (59).

According to the third aspect of the invention, the heat dissipating section (35*a*, 38*a*) of the power module (53) is closer to the outlet (34) of the tank (30) than to the return port (33) thereof. For this reason, after hydraulic fluid passing through the return port (33) and then returned into the tank (30) has been diffused, the hydraulic fluid is brought into contact with the heat dissipating section (35*a*, 38*a*). Thus, even when high-temperature hydraulic fluid is returned into the tank (30), the returned high-temperature hydraulic fluid is diffused, and instead of the temperature of the high-temperature hydraulic fluid immediately after being returned, the average fluid temperature in the tank (30) can be obtained.

According to the fourth aspect of the invention, the baffle (39) is provided in the tank (30) to regulate the flow of hydraulic fluid from the return port (33) to the outlet (34). This allows the hydraulic fluid to be adequately diffused after the hydraulic fluid is returned into the tank (30) and until the hydraulic fluid reaches the heat dissipating section (35*a*, 38*a*). This can further ensure that the average fluid temperature in the tank (30) is obtained.

DESCRIPTION OF EMBODIMENTS

Embodiments of the present invention will be described in detail hereinafter with reference to the drawings. The following embodiments are merely preferred examples in nature, and are not intended to limit the scope, applications, and use of the disclosure.

Figure 1:
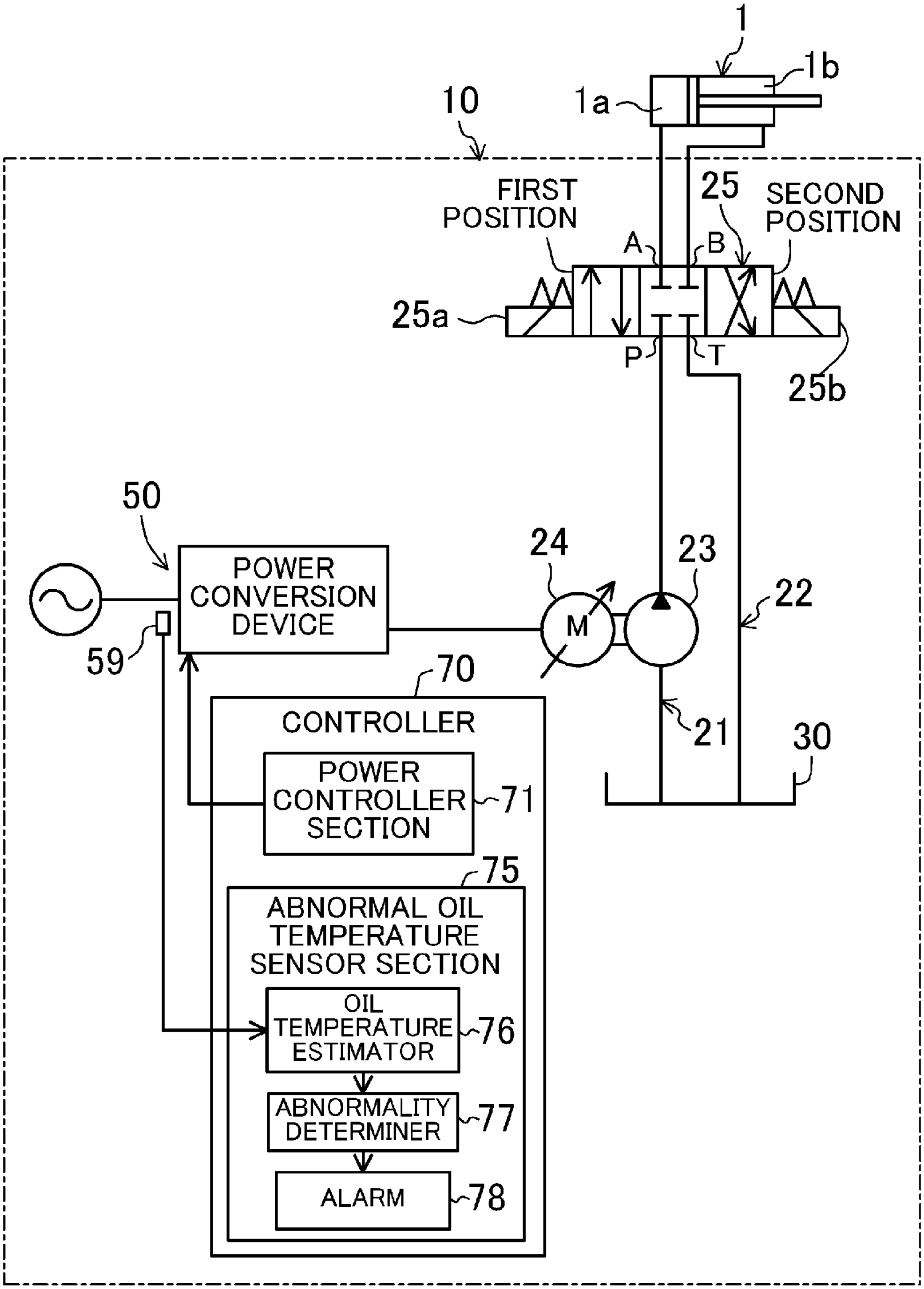
FIG. 1 is a schematic view illustrating the entire configuration of an oil-hydraulic unit of an embodiment.

As illustrated in FIG. 1, an oil-hydraulic unit (10) of this embodiment is configured to feed hydraulic oil to an oil-hydraulic actuator, such as an oil-hydraulic cylinder (1), and actuate the oil-hydraulic actuator. The oil-hydraulic unit (10) forms a hydraulic unit of the present invention. The oil-hydraulic unit (10) is incorporated into, for example, a machine tool, such as a machining center, and is connected to the oil-hydraulic cylinder (1) configured to open and close a chuck mechanism for pinching work or tools to fix them.

The oil-hydraulic unit (10) includes a tank (30), two oil channels (a feed passage (21) and a return passage (22)) connecting the tank (30) to the oil-hydraulic cylinder (1), and a controller (70). The feed passage (21) is one of the oil channels through which hydraulic oil is fed from the tank (30) to the oil-hydraulic cylinder (1), and the return passage (22) is the other one thereof through which hydraulic oil is returned from the oil-hydraulic cylinder (1) to the tank (30). The feed passage (21) is connected to the pump (23), and the feed passage (21) and the return passage (22) are connected to a directional selector valve (25).

The pump (23) is a fixed displacement pump, such as a gear pump, a trochoid pump, a vane pump, or a piston pump, and is configured to suck hydraulic oil from the tank (30) and discharge the hydraulic oil into the oil-hydraulic cylinder (1). A suction side of the pump (23) is connected to an outlet (34) of the tank (30) described below, and a discharge side thereof is connected to a port P of the directional selector valve (25) described below.

The pump (23) is connected to an electric motor (24) for rotating the pump (23). The electric motor (24) is a variable speed motor, and the rotation of the electric motor (24) is controlled by a power conversion device (50). The power conversion device (50) will be described below.

The directional selector valve (25) is a three-position, four-port spring centered electromagnetic selector valve including a first electromagnetic solenoid (25*a*) and a second electromagnetic solenoid (25*b*). Among four ports of the directional selector valve (25), the port P is connected to the discharge side of the pump (23), and a port T is connected to a return port (33) of the tank (30) described below. A port A of the directional selector valve (25) is connected to a head chamber (1*a*) of the oil-hydraulic cylinder (1), and a port B thereof is connected to a rod chamber (1*b*) of the oil-hydraulic cylinder (1).

The directional selector valve (25) is selectable among a neutral position, a first position, and a second position, based on on-off operation of each of the electromagnetic solenoids (25*a*, 25*b*). When the directional selector valve (25) is in the neutral position, the four ports are disconnected from one another. When the directional selector valve (25) is in the first position, the ports P and A communicate with each other, and the ports B and T communicate with each other. When the directional selector valve (25) is in the second position, the ports P and B communicate with each other, and the ports A and T communicate with each other.

Figure 2:
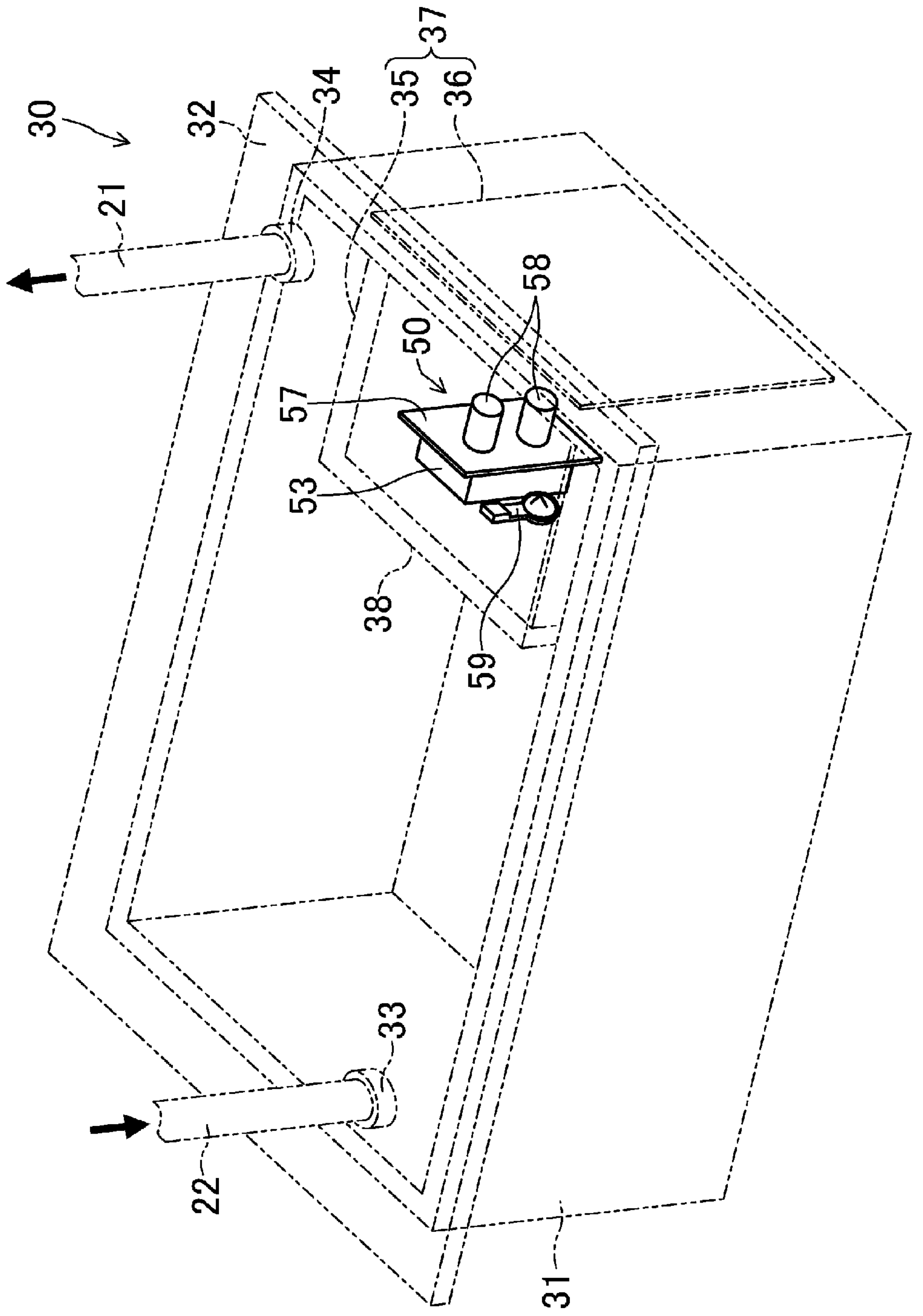
FIG. 2 is a perspective view illustrating the configuration of a tank of this embodiment.
Figure 3:
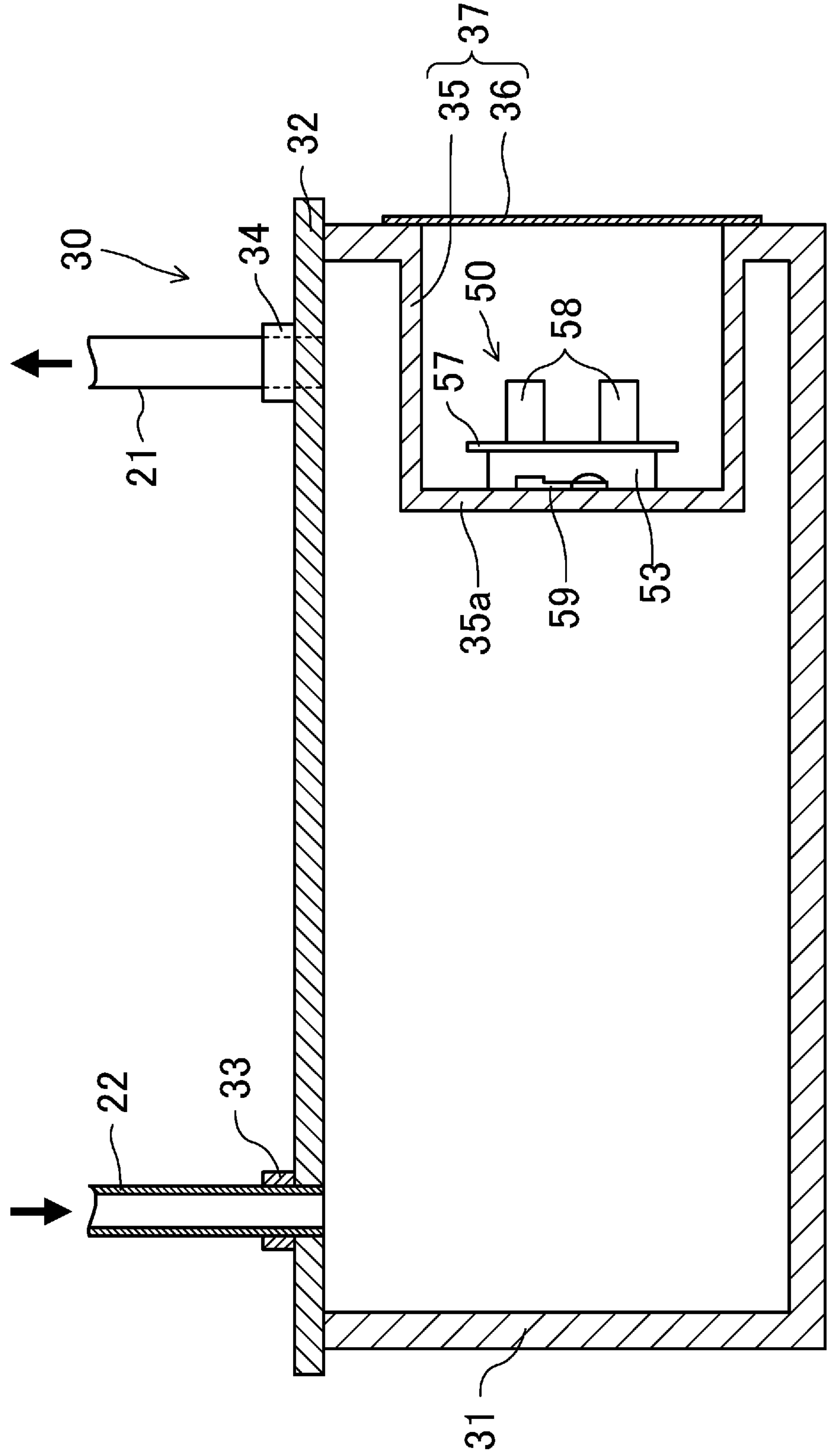
FIG. 3 is a cross-sectional view illustrating the configuration of the tank of this embodiment.

As illustrated in FIGS. 2 and 3, the tank (30) is configured to store hydraulic oil, and includes a rectangular tank body (31) which has an open upper end and in which hydraulic oil is stored, and a lid body (32) blocking the upper end of the tank body (31).

The lid body (32) includes the return port (33) and the outlet (34) both passing therethrough. The return port (33) is close to a left side wall of the tank body (31) (see FIG. 3), and is connected to a pipe (the return passage (22)) extending from the port T of the directional selector valve (25). In contrast, the outlet (34) is close to a right side wall of the tank body (31) (see FIG. 3), and is connected to a pipe (the feed passage (21)) extending to the suction side of the pump (23).

The right side wall of the tank body (31) is recessed inward to form a box-shaped recess (35), and the tank body (31) further includes a plate (36) blocking an opening of the recess (35). The recess (35) and the plate (36) forms a control box (37). The control box (37) (the recess (35)) is closer to the outlet (34) of the tank (30) than to the return port (33) thereof, and faces the stored hydraulic oil. The power conversion device (50) is housed in the control box (37).

<Power Conversion Device>

Figure 4:
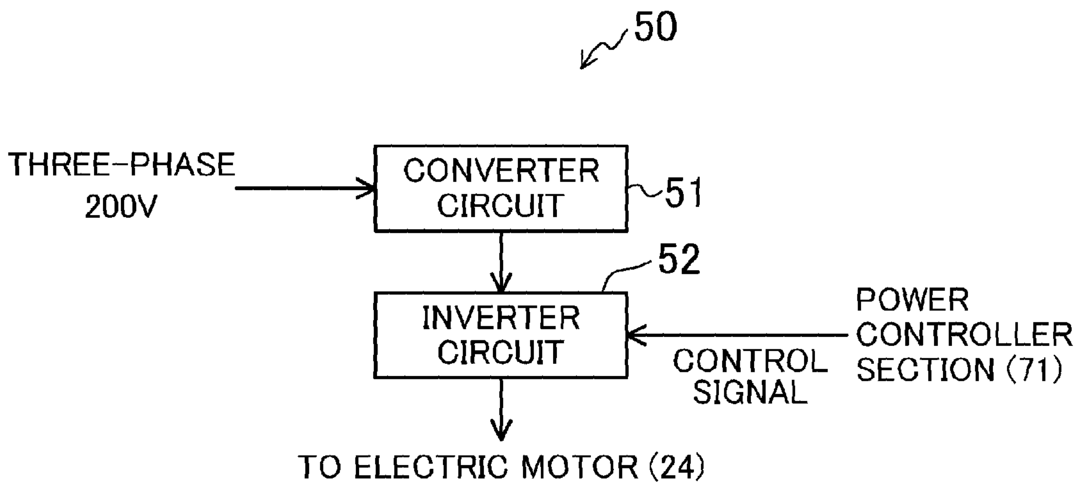
FIG. 4 is a block diagram illustrating the circuit configuration of a power conversion device of this embodiment.

The power conversion device (50) is a so-called inverter configured to convert power supplied from an alternating-current power supply into a predetermined power. As illustrated in FIG. 4, the power conversion device (50) includes a converter circuit (51) and an inverter circuit (52). The converter circuit (51) is connected to the alternating-current power supply (e.g., a three-phase electric power of 200V), and converts the alternating current into direct current. The inverter circuit (52) converts the output of the converter circuit (51) into power having a predetermined frequency based on on-off operation of a switching element (not shown), and the converted power is supplied to the electric motor (24). The on-off operation of the switching element is controlled by a power controller section (71) of the controller (70) described below.

As illustrated in FIGS. 2 and 3, the power conversion device (50) includes a substrate (57), a power module (53), electronic components (58) except the power module (53), and a temperature sensor (59).

Figure 5:
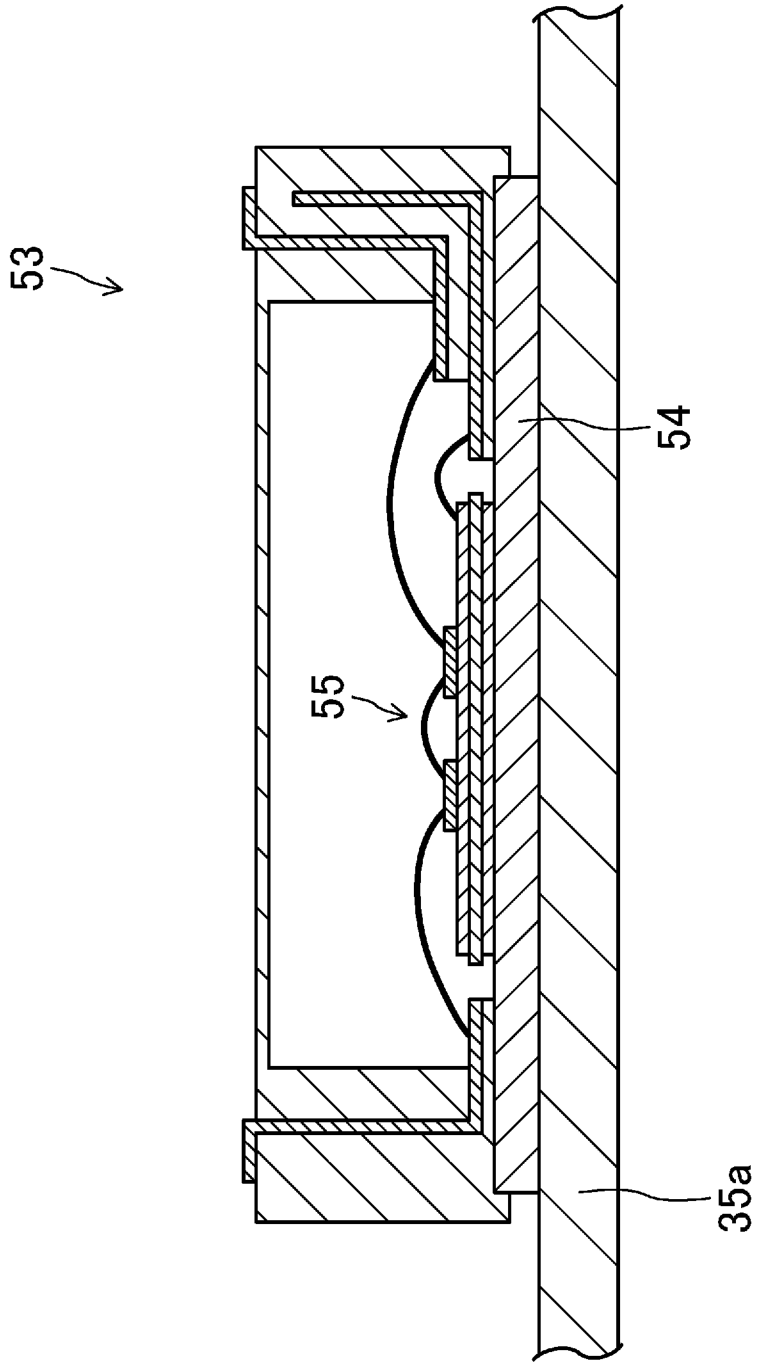
FIG. 5 is a cross-sectional view illustrating the configuration of a power module of this embodiment.

The power module (53) is an electronic component, such as an insulated-gate bipolar transistor (IGBT) or a power metal oxide semiconductor field-effect transistor (MOSFET), including at least one power semiconductor (55) generating a large amount of heat when energized. As illustrated in FIG. 5, the power module (53) includes a base plate (54) fixed to the bottom surface (the inner surface of a bottom wall (35*a*)) of the recess (35), and the at least one power semiconductor (55) is disposed on the base plate (54). When the at least one power semiconductor (55) generates heat, the heat is transferred from the base plate (54) to the bottom wall (35*a*) of the recess (35), and is dissipated into hydraulic oil in the tank (30). The bottom wall (35*a*) of the recess (35) forms a heat dissipating section of the power module (53) of the present invention.

As illustrated in FIGS. 2 and 3, the substrate (57) is fixed on the power module (53). The power module (53) is mounted on the back surface (the left surface in FIG. 3) of the substrate (57), and the other electronic components (58) are mounted on the front surface (the right surface in FIG. 3) thereof, thereby forming the converter circuit (51) and the inverter circuit (52).

The other electronic components (58) are surface mount devices, such as a non-power semiconductor, a capacitor, and/or a resistor, and generate a relatively small amount of heat when energized.

The temperature sensor (59) is a contact temperature sensor that is, for example, a thermistor or a resistance thermometer. The temperature sensor (59) is configured to detect the temperature of the power module (53), and is fixed to a region of the bottom surface of the recess (35) near the power module (53). Furthermore, the temperature sensor (59) is configured to output a detected value T to an oil temperature estimator (76) of the controller (70) described below.

<Controller>

The controller (70) includes the power controller section (71) and the abnormal oil temperature sensor section (75).

The power controller section (71) controls on-off operation of the switching element of the inverter circuit (52). Specifically, the power controller section (71) receives the detected rotational speed of the electric motor (24) and a target rotational speed (a set value) to perform proportional-integral (PI) control. Thus, a control signal for performing on-off operation of the switching element is generated, and the control signal is output to the inverter circuit (52).

The abnormal oil temperature sensor section (75) is configured to sense whether the oil temperature in the tank (30) is abnormal, and includes the oil temperature estimator (76), an abnormality determiner (77), and an alarm (78).

The oil temperature estimator (76) calculates the estimate oil temperature Tes in the tank (30) based on the value T detected by the temperature sensor (59). The oil temperature estimator (76) forms a fluid temperature estimator of the present invention. The estimate oil temperature Tes is output to the abnormality determiner (77).

The abnormality determiner (77) compares the estimate oil temperature Tes calculated by the oil temperature estimator (76) to a predetermined threshold value Tsh to determine whether or not the oil temperature is abnormal. When the abnormality determiner (77) determines that the oil temperature is abnormal, the determination result is output to the alarm (78).

The alarm (78) receives the determination result in which the oil temperature is abnormal from the abnormality determiner (77), thereby issuing an alarm about the situation where the oil temperature is abnormal. A display, such as a warning lamp, or a sound producer, such as a beeper, may be used as a means by which the alarm (78) issues an alarm.

—Operational Behavior—

The operational behavior of the oil-hydraulic unit (10) will be described hereinafter.

When the power conversion device (50) converts electric power, and the converted electric power is fed to the electric motor (24), the pump (23) connected to the electric motor (24) is rotated. The pump (23) sucks hydraulic oil in the tank (30) and discharges the hydraulic oil to feed the hydraulic oil to the oil-hydraulic cylinder (1).

When the directional selector valve (25) selects the first position, hydraulic oil is fed from the tank (30) to the head chamber (1*a*) of the oil-hydraulic cylinder (1), and is returned from the rod chamber (1*b*) to the tank (30), and the oil-hydraulic cylinder (1) moves toward the right. In contrast, when the directional selector valve (25) selects the second position, hydraulic oil is fed from the tank (30) to the rod chamber (1*b*) of the oil-hydraulic cylinder (1), and is returned from the head chamber (1*a*) to the tank (30), and the oil-hydraulic cylinder (1) moves toward the left.

While hydraulic oil is fed as above, the power module (53) of the power conversion device generates heat. However, in this embodiment, the power module (53) is provided on the bottom surface (the inner surface of the bottom wall (35*a*)) of the recess (35) facing hydraulic oil in the tank (30). For this reason, even if the power module (53) generates heat, the heat is removed by the hydraulic oil in the tank (30). This allows the power module (53) to keep having substantially the same temperature as the hydraulic oil in the tank (30).

The pressure of hydraulic oil is increased, and the hydraulic oil increased in pressure is fed to the oil-hydraulic cylinder (1). This increases the temperature of the hydraulic oil. However, in this embodiment, the abnormal oil temperature sensor section (75) derives the estimate oil temperature Tes in the tank (30), and senses whether the oil temperature is abnormal based on the estimate oil temperature Tes.

<Control Operation of Abnormal Oil Temperature Sensor Section>

Figure 6:
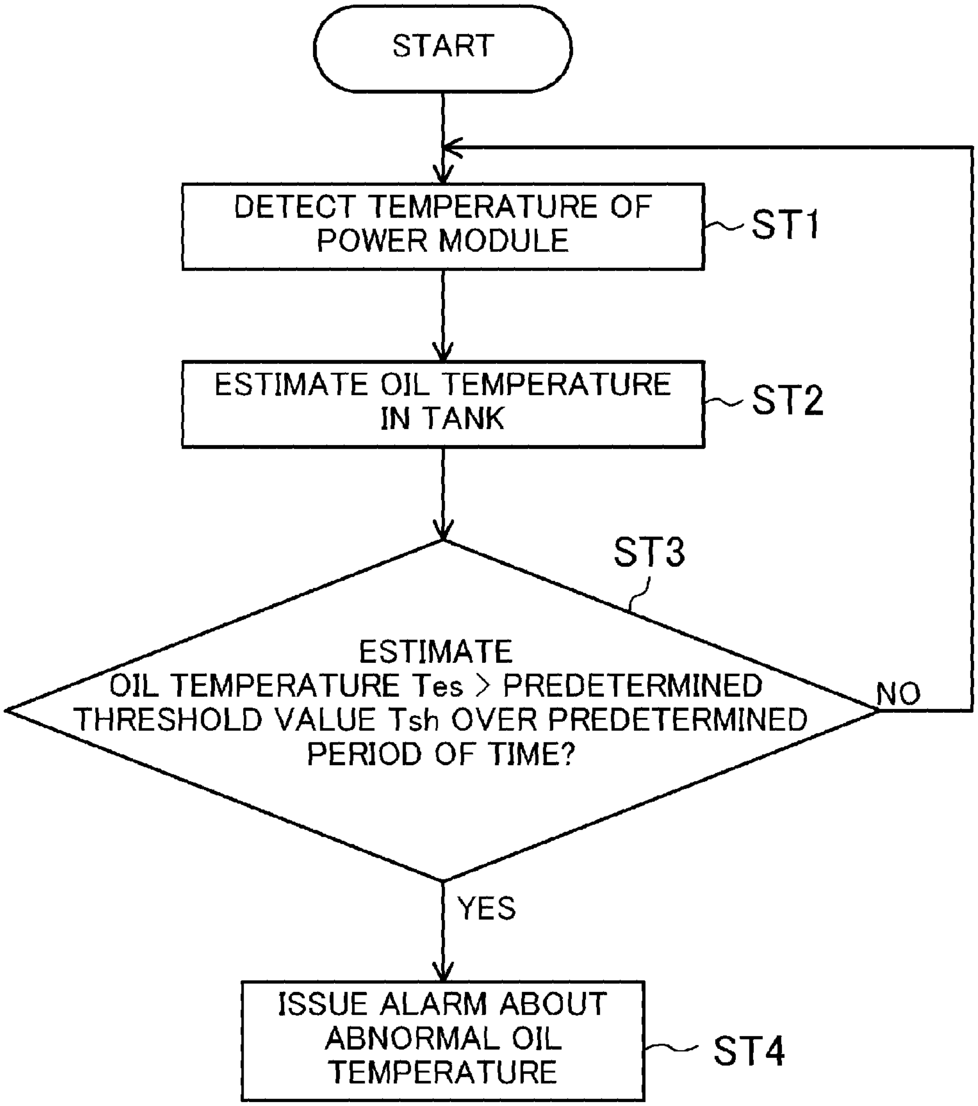
FIG. 6 is a flow chart illustrating control operation of an abnormal oil temperature sensor section of this embodiment.

As illustrated in FIG. 6, the abnormal oil temperature sensor section (75) senses whether the oil temperature in the tank (30) is abnormal.

First, in step ST1, the temperature of the power module (53) is detected by the temperature sensor (59). The detected value T is input to the oil temperature estimator (76).

In step ST2, the oil temperature estimator (76) derives the estimate oil temperature Tes in the tank (30). Specifically, an operation is performed on the detected value T in step ST1 and several parameters (e.g., the thickness and thermal conductivity of the bottom wall (35*a*)), thereby deriving the estimate oil temperature Tes. The estimate oil temperature Tes is output to the abnormality determiner (77).

In step ST3, the abnormality determiner (77) compares the estimate oil temperature Tes calculated in step ST2 to the predetermined threshold value Tsh to determine whether or not the oil temperature is abnormal. Specifically, when the state in which the estimate oil temperature Tes is greater than the predetermined threshold value Tsh continues over a predetermined period of time, it is determined that the oil temperature is abnormal. This process proceeds to step ST4. In contrast, when the estimate oil temperature Tes is not greater than the predetermined threshold value Tsh, or when the state in which the estimate oil temperature Tes is greater than the predetermined threshold value Tsh does not continue over a predetermined or longer period of time, it is not determined that the oil temperature is abnormal. This process returns to step ST1.

In step ST4, the determination result in which the oil temperature is abnormal is input to the alarm (78), thereby issuing an alarm about the situation where the oil temperature is abnormal.

The abnormal oil temperature sensor section (75) repeatedly performs steps ST1 through ST3 at predetermined time intervals during operation of the oil-hydraulic unit (10) to repeatedly determine whether or not the oil temperature is abnormal. If it is determined that the oil temperature is abnormal, an alarm about the situation where the oil temperature is abnormal is issued in step ST4.

Advantages of First Embodiment

According to this embodiment, the power module (53) is provided on the bottom wall (35*a*) of the recess (35) facing hydraulic oil in the tank (30). The temperature of the power module (53) is detected, and the oil temperature in the tank (30) is estimated based on the detected value T. Thus, the power module (53) is cooled by the hydraulic oil, and the power module (53) has substantially the same temperature as the hydraulic oil in the tank (30). Under such conditions, the oil temperature in the tank (30) is estimated based on the detected temperature of the power module (53), and the oil temperature in the tank (30) can be thus obtained as the estimate oil temperature Tes with a small error. This eliminates the need for measuring the oil temperature in the tank (30) with a special oil temperature sensor unlike the conventional art, and can reduce the cost of the oil-hydraulic unit (10).

Furthermore, according to this embodiment, the temperature sensor (59) configured to detect the temperature of the power module (53) is provided on the bottom wall (35*a*) of the recess (35) on which the power module (53) is also provided. This allows the temperature detected by the temperature sensor (59) to be closer to the oil temperature in the tank (30), thereby enabling a more accurate estimation of the oil temperature based on the temperature detected by the temperature sensor (59).

Moreover, according to this embodiment, the bottom wall (35*a*) of the recess (35) on which the power module (53) is provided is closer to the outlet (34) of the tank (30) than to the return port (33) thereof. For this reason, after hydraulic oil passing through the return port (33) and then returned into the tank (30) has been diffused, the hydraulic oil can be brought into contact with the bottom wall (35*a*). Thus, even when high-temperature hydraulic fluid is returned into the tank (30), the returned high-temperature hydraulic oil is diffused, and thereafter, instead of the temperature of the high-temperature hydraulic oil immediately after being returned, the average oil temperature in the tank (30) can be obtained.

Other Embodiments

The embodiment may be configured as below.

In the embodiment, an operation is performed on the value T detected by the temperature sensor (59) and several parameters (e.g., the thickness and thermal conductivity of the bottom wall (35*a*)), thereby deriving the estimate oil temperature Tes. However, a process for deriving the estimate oil temperature Tes is not limited to the above process. For example, a table indicating the relationship between the value T detected by the temperature sensor (59) and the oil temperature in the tank (30) may be previously prepared, and the estimate oil temperature Tes may be derived with reference to the table. Alternatively, if the difference between the value T detected by the temperature sensor (59) and the oil temperature in the tank (30) is very small, the value T detected by the temperature sensor (59) may be used as the estimate oil temperature Tes without being changed.

Figure 7:
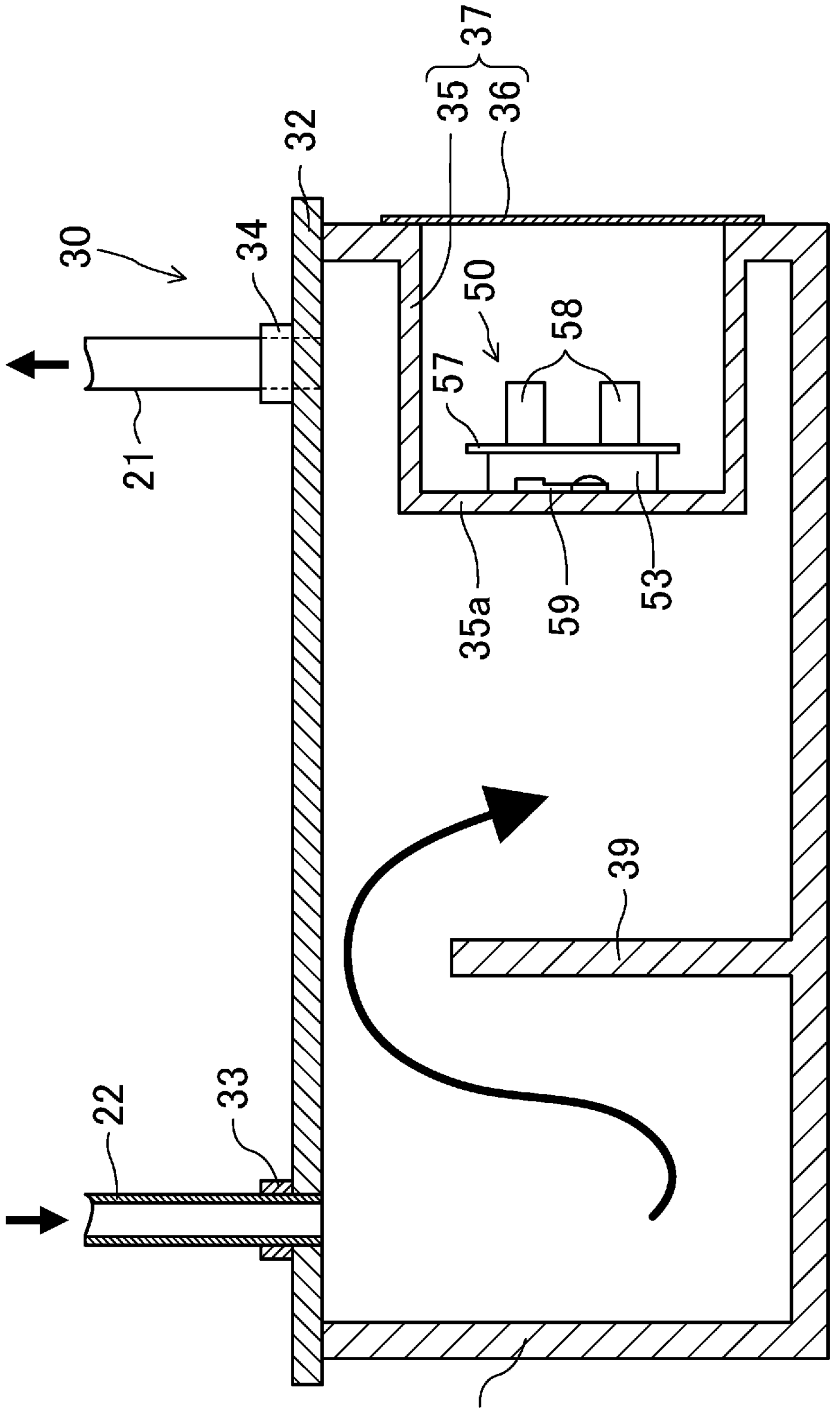
FIG. 7 is a cross-sectional view illustrating the configuration of a tank of another embodiment.
Figure 8:
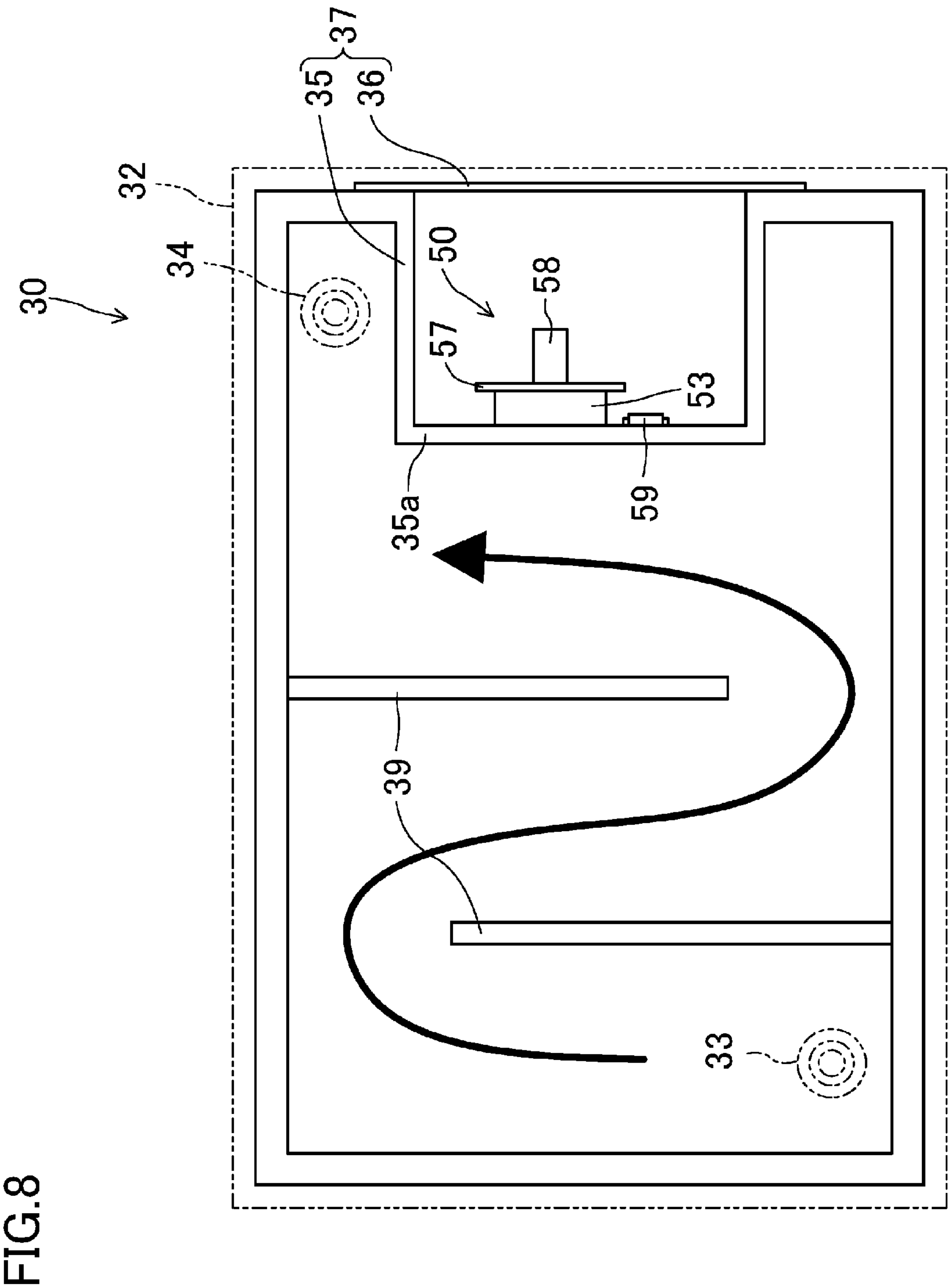
FIG. 8 is a plan view illustrating the configuration of a tank of still another embodiment.

In the embodiment, an object configured to regulate the flow of hydraulic oil is not provided between the return port (33) and outlet (34) of the tank (30). However, a baffle or baffles (39) may be provided such that hydraulic oil meanders between the return port (33) and the outlet (34). As illustrated in FIG. 7, the baffle (39) may be provided such that hydraulic oil returned into the tank (30) crosses over the baffle (39), and flows to the outlet (34). Alternatively, as illustrated in FIG. 8, the baffles (39) may be provided such that hydraulic oil returned into the tank (30) meanders in lateral directions. As such, the provision of the baffle or baffles (39) allows the hydraulic oil to be adequately diffused after the hydraulic oil is returned into the tank (30) and until the hydraulic oil reaches the bottom wall (35*a*) of the recess (35). This can ensure that instead of the temperature of the hydraulic oil immediately after being returned, the average oil temperature in the tank (30) is obtained.

Figure 9:
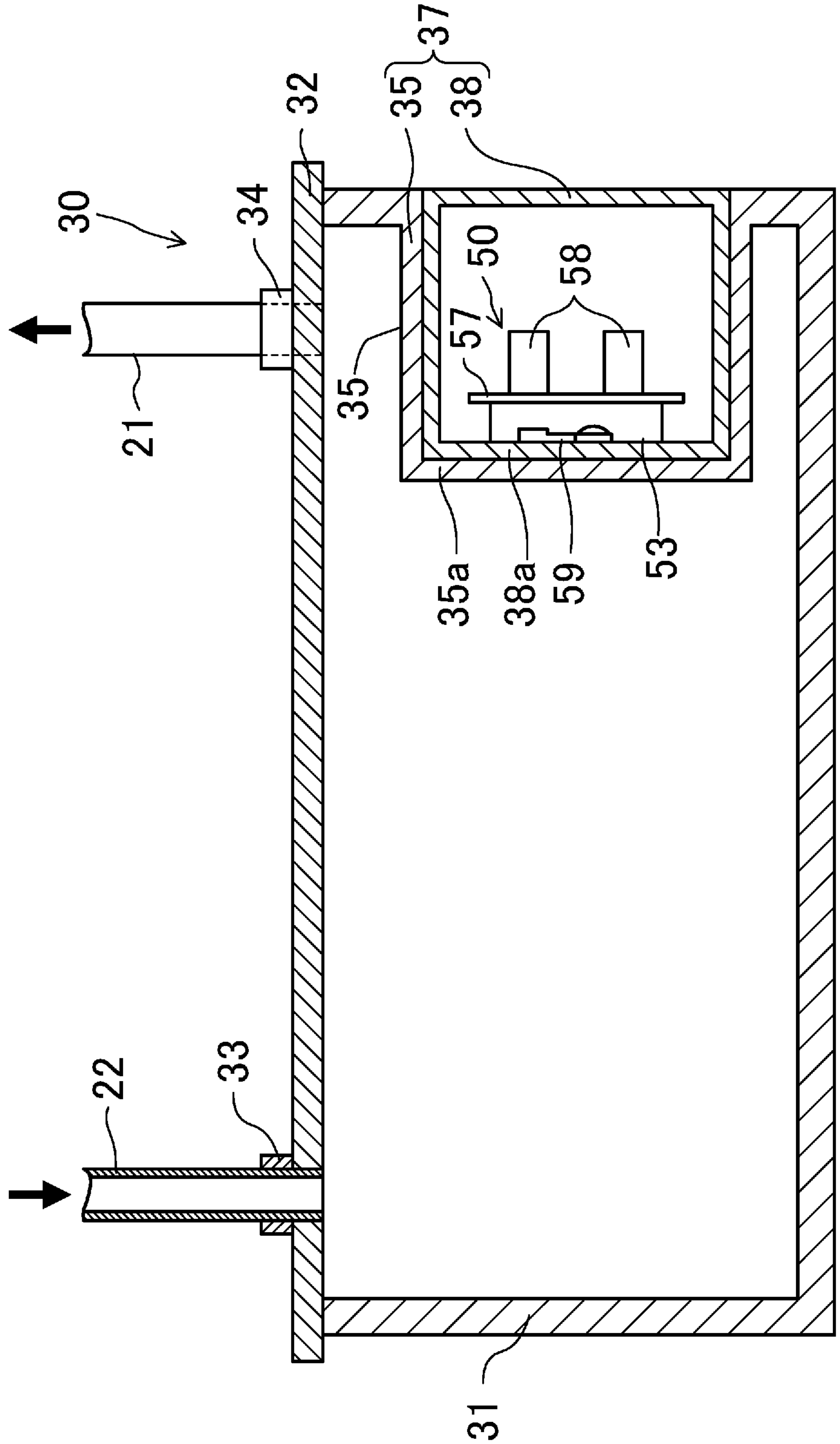
FIG. 9 is a cross-sectional view illustrating the configuration of a tank of yet another embodiment.

In the embodiment, the recess (35) and the plate (36) form the control box (37). However, for example, as illustrated in FIG. 9, a box (38) may be inserted into the recess (35), and the recess (35) and the box (38) may form the control box (37). In this case, the power module (53) is provided on the inner surface of a back plate (38*a*) of the box (38), and the heat dissipating section of the power module (53) of the present invention includes the bottom wall (35*a*) of the recess (35) and the back plate (38*a*) of the box (38) being in close contact with the bottom wall (35*a*).

In the embodiment, the temperature sensor (59) is provided on the bottom surface (the inner surface of the bottom wall (35*a*)) of the recess (35) on which the power module (53) is also provided. However, the location at which the temperature sensor (59) is provided is not limited to the above location. As long as the temperature sensor (59) is provided at a location at which the temperature of the power module (53) can be detected, the temperature sensor (59) may be provided, for example, inside the power module (53) or on a surface different from the surface on which the power module (53) is provided.

INDUSTRIAL APPLICABILITY

As described above, the hydraulic unit according to the present invention is useful as an oil-hydraulic unit configured to feed hydraulic oil to an oil-hydraulic actuator.

DESCRIPTION OF REFERENCE CHARACTERS

10 Oil-Hydraulic Unit (Hydraulic Unit)
21 Feed Passage
22 Return Passage
23 Pump
24 Electric Motor
30 Tank
33 Return Port
34 Outlet
35*a* Bottom Wall (Heat Dissipating Section)
38*a* Back Plate (Heat Dissipating Section)
39 Baffle
50 Power Conversion Device
53 Power Module
59 Temperature Sensor
76 Oil Temperature Estimator (Fluid Temperature Estimator)

The invention claimed is:

1. A hydraulic unit comprising:
a tank configured to store hydraulic fluid;
a pump configured to suck the hydraulic fluid through an outlet of the tank;
a feed passage through which the hydraulic fluid sucked by the pump is fed to a hydraulic actuator;
a return passage through which the hydraulic fluid is returned from the hydraulic actuator to a return port of the tank;
an electric motor configured to rotate the pump; and
a power conversion device configured to convert electric power into a predetermined power and feed the converted power to the electric motor, wherein
the power conversion device includes
a power module including a heat dissipating section facing the hydraulic fluid in the tank, and
a temperature sensor configured to detect a temperature of the power module, and
the hydraulic unit further includes a fluid temperature estimator configured to estimate a temperature of the hydraulic fluid in the tank based on the temperature detected by the temperature sensor.

2. The hydraulic unit of claim 1, wherein
the temperature sensor is provided on the heat dissipating section of the power module.

3. The hydraulic unit of claim 1, wherein
the heat dissipating section of the power module is closer to the outlet of the tank than to the return port thereof.

4. The hydraulic unit of claim 2, wherein
the heat dissipating section of the power module is closer to the outlet of the tank than to the return port thereof.

5. The hydraulic unit of claim 3, wherein
a baffle is provided in the tank to regulate a flow of the hydraulic fluid from the return port to the outlet.

6. The hydraulic unit of claim 4, wherein
a baffle is provided in the tank to regulate a flow of the hydraulic fluid from the return port to the outlet.

* * * * *